Feb. 1, 1955  R. E. SELLERS ET AL  2,701,182
THERMAL BALANCING PROCESS FOR FORMING A SOLUTION OF
A SOLUTE IN A SOLVENT CHARACTERIZED BY THE RELEASE
OF HEAT WHEN INTERACTED WITH THE SOLUTE
Filed June 1, 1951  2 Sheets-Sheet 1

ROBERT E. SELLERS
DAVID F. MORRIS
INVENTORS
HUEBNER, BEEHLER,
WORREL & HERZIG
ATTORNEYS
BY
Richard M. Horrel

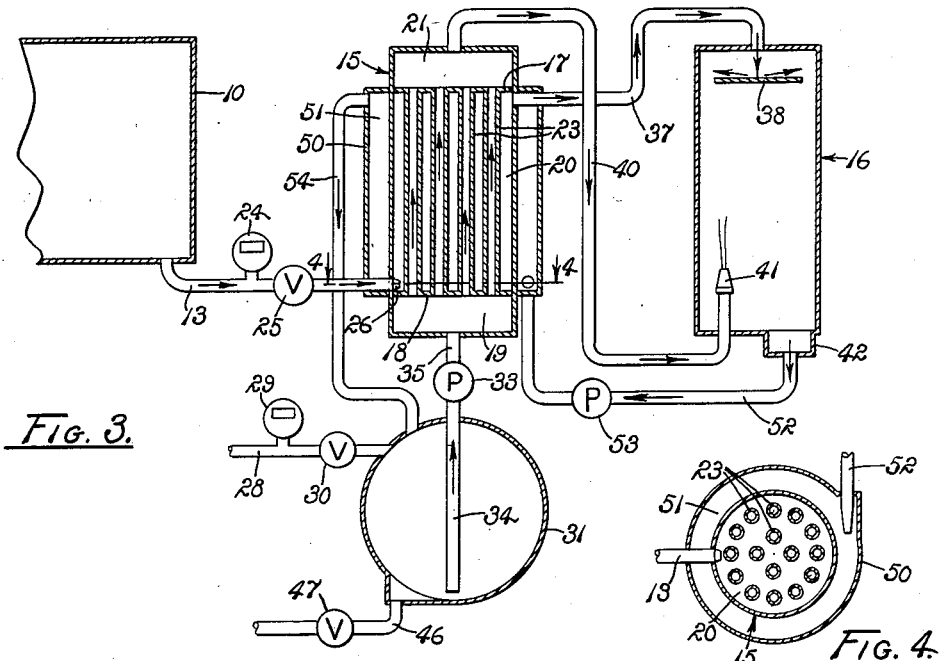
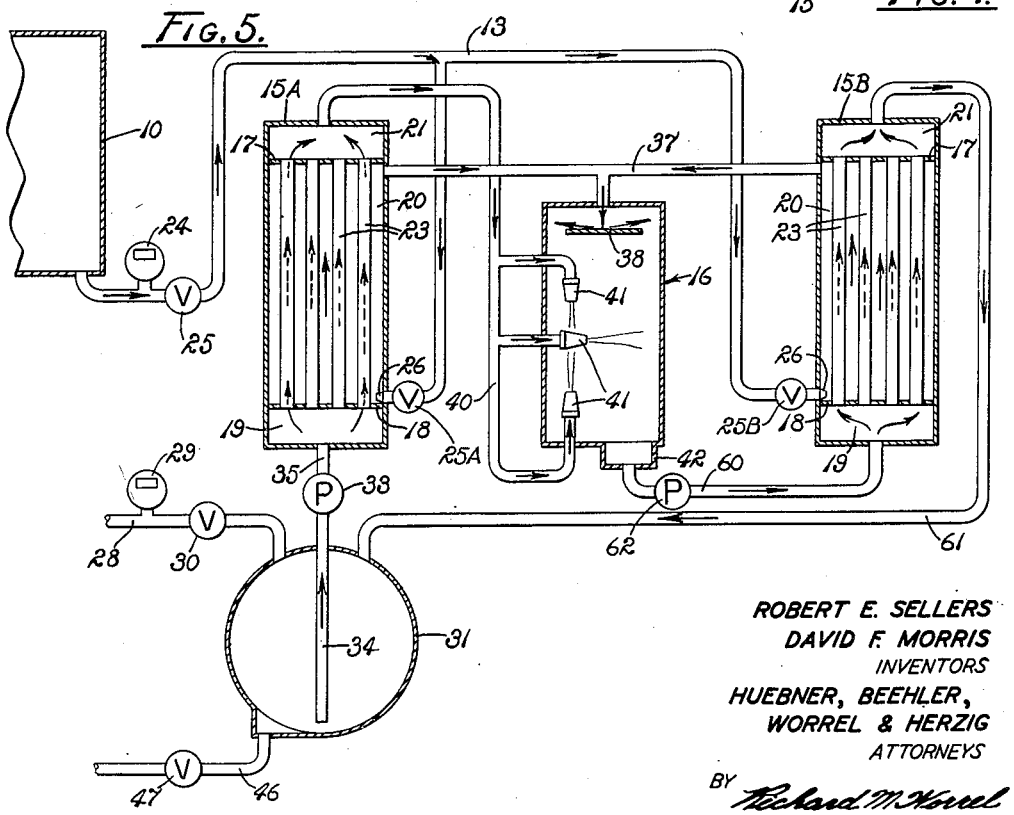

2,701,182
Patented Feb. 1, 1955

United States Patent Office

2,701,182

THERMAL BALANCING PROCESS FOR FORMING A SOLUTION OF A SOLUTE IN A SOLVENT CHARACTERIZED BY THE RELEASE OF HEAT WHEN INTERACTED WITH THE SOLUTE

Robert E. Sellers and David F. Morris, Fresno, Calif., assignors to Sunland Industries, Inc., Fresno, Calif., a corporation of California Application June 1, 1951, Serial No. 229,514

7 Claims. (Cl. 23—193)

The present invention relates to processes and apparatus for forming solutions of a solute having a relatively low boiling point and a solvent therefor having a relatively higher boiling point and more particularly to a thermally balanced process and apparatus especially suited to the formation of aqueous ammonia from anhydrous ammonia under an initial pressure sufficient to maintain the ammonia in a liquid state.

The utility of the present invention is readily demonstrated and an understanding thereof more easily imparted by brief reference to its significance in the production of low cost fertilizer for agricultural lands. It is well known that the natural equilibrium established in a soil under its environment of climate, drainage, bacterial content, and native vegetation can be improved by proper soil care and the introduction of plant nutrient material. The application of aqueous ammonia and various ammonium salts to soil is frequently practiced to increase the nitrogen content of the soil available to plant life. Whether the ammonia is directly utilized by the plant life or only after conversion first to nitrites and then to nitrates, does not concern the present invention. It is well known that the addition of aqueous ammonia to many soil types is highly beneficial and that, of course, the more economically such material is made available the more widespread can be its use. Although ammonia is constantly being formed in soils as the result of the action of nitrifying bacteria on organic matter in the soil, the quantity present is usually only a few parts per million of soil.

In the commercial production of aqueous ammonia, it is the usual practice to convert anhydrous ammonia to ammonium hydroxide having a predetermined nitrogen content by interacting measured quantities of gaseous ammonia and water and refrigerating the end product to remove the considerable amount of heat generated. The anhydrous ammonia is usually obtained from a source by fertilizer processors in railway tank cars under sufficient pressure to maintain the ammonia in liquid form. The ammonia, under conventional practices, is either dissolved in water while still in liquid form, as taught by the patents to Harvey, No. 1,885,012 and No. 2,023,199, or slowly released from the source thereof and permitted to vaporize subsequent to which the gaseous ammonia is slowly dissolved in water and the heat generated by the interaction of the ammonia and water removed by elaborate refrigeration systems. As set forth in the earlier patent to Harvey, prior to the instant invention, it has been considered impossible to dissolve gaseous ammonia in water at a rate sufficiently rapid to be commercially practical without refrigeration.

Further, the more popular commercial practices followed in the formation of aqueous ammonia require a source of energy to supply the heat of vaporization to the ammonia in liquid form as usually received.

The conventional processes for forming aqueous ammonia have proved efficacious but subject to certain difficulties which the present invention seeks to overcome. Elaborate and costly processing plants are required. The requisite apparatus is so bulky as to be immovable. Aqueous ammonia formed therein frequently must be transported great distances before application to farm lands. The cost of transporting the high water content of aqueous ammonia is a substantial part of the cost of the fertilizer to the farmer. The capital investments required and the expenses incident to the refrigeration of aqueous ammonia formed are substantial. It is frequently difficult under conventional processes and apparatus economically to produce aqueous ammonia of desired nitrogen content.

An object of the present invention is, therefore, to provide an improved process and apparatus for forming solutions of a solute having a relatively low boiling point and a solvent therefor having a relatively higher boiling point that have particular advantage when employed with those solutes and solvents which are known to release objectionable quantities of heat upon their interaction.

Another object is to provide an improved process and apparatus for the formation of aqueous ammonia.

Another object is to provide a thermally balanced process and apparatus for forming aqueous ammonia from anhydrous ammonia under initial pressure sufficient to maintain the ammonia in a liquid form.

Another object is to provide an apparatus for forming aqueous ammonia which is of such simplicity that it can readily be made available in mobile form so that anhydrous ammonia can be converted into aqueous ammonia at any point at which the requisite constituents are available.

Another object is to reduce the cost of aqueous ammonia by reducing or eliminating expenses incident to the transportation of large volumes of water.

Another object is to eliminate the conventional requirement for an independent heat source to vaporize liquid anhydrous ammonia in conventional aqueous ammonia producing processes.

Another object is to eliminate the conventional requirement for elaborate refrigeration equipment in the production of aqueous ammonia involving the introduction of gaseous ammonia into water.

Another object is to provide a thermally self-sufficient process and apparatus for precooling water and postcooling aqueous ammonia in an aqueous ammonia producing process.

Further objects and advantages are to provide improved steps, elements, and arrangements thereof in a process and apparatus of the character set forth that are fully effective in accomplishing the intended purposes.

Still further objects and advantages will become apparent in the subsequent description in the specification.

In the drawings:

Fig. 3 is a schematic representation and flow diagram of a second form of the present invention.

Fig. 4 is a horizontal section of an evaporating unit of the present invention, as taken through a complete unit at the position represented by the line 4—4 in Fig. 3.

Fig. 5 is a schematic representation and flow diagram of a third form of the present invention.

Referring in greater detail to the drawings:

A source of anhydrous ammonia under sufficient pressure to maintain the ammonia in a liquid state at all normally encountered environmental temperatures is shown at 10 consisting of a railway tank car. It will be obvious that the present invention may be utilized in connection with any source of ammonia or other appropriate solute under sufficient pressure to be maintained in liquid form under normal temperatures. A trailer 11 is representative of the vehicles generally on which an apparatus 12 of the present invention may be mounted for mobility. The apparatus, of course, may be installed in a permanent location when stationary operation is appropriate.

A supply line 13, of any suitable form, interconnects the tank car 10 and the apparatus 12 of the present invention mounted on the trailer 11 or in any other desired location and serves to conduct liquid anhydrous ammonia from the tank car to the apparatus.

Figure 2:
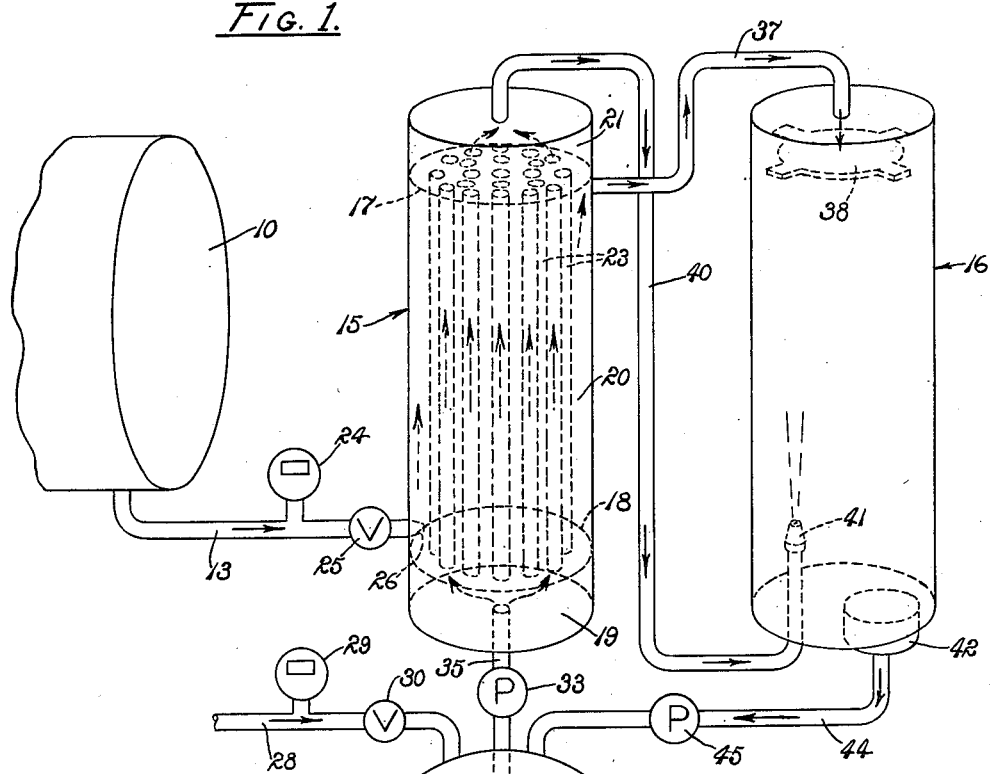
Fig. 2 is a schematic representation and flow diagram of a form of the present invention.

The apparatus of the first form of the present invention is shown in Fig. 2 and utilizes an evaporation chamber 15 and a mixing chamber 16 which are conveniently closed cylindrical tanks of any suitable material mounted in longitudinally erect positions. The evaporation chamber has an upper partition 17 mounted in adjacent spaced relation to the upper end of the chamber and a lower partition 18 mounted in adjacent spaced relation to the lower end of the chamber. The partitions define a lower compartment 19, a central compartment 20 and an upper compartment 21 in the chamber.

A plurality of thin-walled tubes 23 of heat conducting material interconnect the partitions 17 and 18 in fluid-tight engagement and provide liquid communication between the lower and upper compartments 19 and 21. The supply line 13 preferably provides a flow meter 24 and a flow regulating valve 25 and is connected to the central compartment 20 of the evaporation chamber 15 adjacent to the lower partition 18. An expansion valve 26 is provided on the end of the supply line 13 in the central compartment whereby liquid anhydrous ammonia is released into the evaporation chamber 15. In actual practice it is frequently convenient to mount the valve 25 closely adjacent to the evaporation chamber 15 and to employ it as a pressure release valve, in which event, the expansion valve 26 is not required.

A water feed line 28 is connected to any suitable source, not shown, of water under pressure and provides a flow meter 29 and a flow regulating valve 30. The water line is connected to a reservoir 31 of any convenient form and supplies water thereto in regulated amounts by manipulation of the valve 30 aided by observation of the meter 29.

A supply pump 33 has an intake 34 extended downwardly into the reservoir and a discharge 35 connected to the lower compartment 19 of the evaporation chamber 15. The pump serves to supply water or other fluid under pressure to the lower compartment for flow upwardly through the tubes 23 to the upper compartment 21. A gas conduit 37 is connected to the central compartment 20 of the evaporation chamber 15 adjacent to the upper partition 17 and extended into the upper end of the mixing chamber 16. It has been found preferable to mount the gas conduit 37 concentrically in the upper end of the mixing chamber 16 and to direct it axially downwardly of the chamber. A baffle plate 38 is mounted within the chamber in spaced relation to the inner end of the conduit 37 to disperse gaseous ammonia conducted to the mixing chamber by the conduit.

A water conduit 40 has an end connected to the upper end of the evaporation chamber 15 and an opposite end extended upwardly into the mixing chamber 16. A spray nozzle 41 is mounted on the conduit 40 within the mixing chamber. The mixing chamber is provided with a sump 42 into which liquid descends and is collected for removal. A drainage conduit 44 is connected to the sump 42 and to the reservoir 31. Liquid may be gravitationally conducted from the sump into the reservoir or a pump 45 may be provided in the conduit 44 in order positively to convey liquid to the reservoir. Whether the pump 45, the pump 33, or gravity flow is relied upon to evacuate the sump, liquid collected in the sump is removed therefrom at a rate sufficient to maintain a pressure in the central compartment 20 of the evaporation chamber at or below the point at which the liquid anhydrous ammonia or other solute delivered thereto will boil at the environmental temperature of the described apparatus.

A conduit 46 is extended out of the bottom of the reservoir 31 and provided with a valve 47 whereby liquid may be selectively drawn from the reservoir.

Operation

Figure 1:
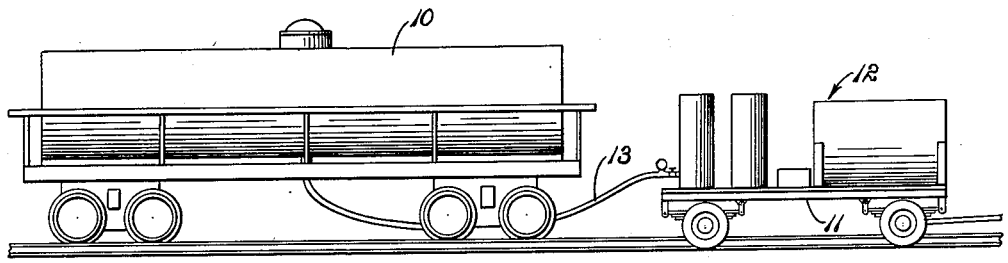
Fig. 1 is a side elevation of a railway tank car characterizing conventional sources of liquid anhydrous ammonia shown coupled to a mobile apparatus embodying the principles of the present invention.

The operation of the apparatus described in connection with Figs. 1 and 2 is believed to be clearly apparent and is briefly summarized at this point. The valve 25 is opened to release anhydrous ammonia from the source 10 thereof into the evaporation chamber 15 at a desired rate measurable on the meter 24. The anhydrous ammonia is emitted from the expansion valve 26 into the central compartment 20 of the evaporation chamber and expands to form gaseous ammonia which rises in the central compartment about the tubes 23.

The evaporation of the ammonia results in a lowering of the temperature in the central compartment frequently sufficient, in the absence of water flow through the tubes, to cause freezing at the expansion valve and inhibiting of the ammonia release. A regulated volume of water is supplied to the reservoir 31 by opening the valve 30 and closing the same when an adequate supply has been indicated as passing through the meter 29. The pump 33 is operated to supply water under pressure to the lower compartment 19 and to force the same upwardly through the tubes 23 into the upper compartment 21 and thence through the water conduit 40 and nozzle 41 upwardly into the mixing chamber 16 in spray pattern. The water is usually at tap or environmental temperature or therebetween, and supplies heat to the central compartment 20 to insure continued release of gaseous ammonia from the expansion valve. As the gaseous ammonia is warmed by the water, the water is, of course, correspondingly cooled.

During seasons of the year in which aqueous ammonia fertilizer is desired, the environmental temperature seldom drops below 32° F. or climbs much above 100° F. The apparatus and process of the present invention is operable in thermal balance without independent heat or refrigeration throughout this temperature range and beyond. For example, in one commercial installation of the subject invention, water and anhydrous ammonia are admitted to the evaporation chamber at approximately 70° F. Water sprayed upwardly into the mixing chamber 16 is found to be at approximately 58° F. The gaseous ammonia cascading downwardly in the mixing chamber is more efficiently absorbed by water sprayed upwardly into the chamber the closer their temperatures approach uniformity.

It will be clearly apparent that the uniformity of the ammonia and water temperature delivered to the mixing chamber 16 will depend to a very large extent upon the heat transferring efficiency of the tubes 23 in the evaporation chamber. The efficiency may vary considerably incident to modifications in rate of release of the anhydrous ammonia into the evaporation chamber and the rate of water flow therethrough.

A significant feature of the present invention is that the water and ammonia are passed through the evaporation chamber 15 in physically isolated heat exchanging relation. It will be observed that the water and the ammonia are isolated until they reach the mixing chamber 16 wherein the gaseous ammonia descends through an upwardly directed spray of water. As the ammonia contacts the water a substantial portion thereof is dissolved in the water and substantial quantities of heat released. Although the total amount of heat released can vary considerably depending upon the rate of operation and concentration of solution formed, normal large-volume operation seldom causes the temperature in the mixing chamber 16 to go appreciably below or above a range from 105° F. to 140° F.

Aqueous ammonia formed by the interaction of the gaseous ammonia and water in the mixing chamber 16 descends into the sump 42 and is removed therefrom through the drainage conduit 44 and conducted to the reservoir 31. The aqueous ammonia may be recirculated by the pump 33 one or more times, if desired, to increase the ammonia content of the aqueous ammonia. Household ammonium hydroxide is of relatively low ammonia content and is conveniently formed in a single operation. To attain the desired 20% to 33% by weight of ammonia concentration for fertilizers, it is sometimes necessary to recirculate the aqueous ammonia one or more times through the described system.

Again, it is pointed out that the pump 45 and/or the pump 33 is operated to remove fluid from the mixing chamber at a rate sufficient to keep the pressure in the central compartment 20 of the evaporation chamber below the boiling point of the anhydrous ammonia at the environmental temperature. During normal operations the pressure of the anhydrous ammonia decreases in the tank car 10 from an initial pressure of from 100 to 250 lbs. per square inch to a pressure only sufficient to cause flow through the line 13. The pressure in the central compartment of the mixing chamber is normally maintained at approximately atmospheric pressure or within two column inches of mercury of that pressure. It will be obvious that there is no specifically critical pressure for the evaporation chamber 15 and that the pressure may be varied in relation to the supply pressure of the anhydrous ammonia and the environmental temperature, as desired.

Second form

Elements of the second form of the invention shown in Figs. 3 and 4 which correspond to elements in the first form already described are given the same identifying numerals. The second form differs from the first form in the provision of a closed cylindrical jacket 50 of a length substantially equal to the spacing of the partitions 17 and 18 mounted concentrically on the evaporation chamber 15 to provide an annular compartment about the central compartment 20 thereof. Instead of directing fluid directly from the sump 42 back to the reservoir 31, a drainage conduit 52 is connected to the sump 42 and directed tangentially into the annular compartment 51 adjacent the lower end thereof. A pump 53 is provided in the drainage conduit 52 and serves to draw fluid from the sump and to project it tangentially into the annular compartment 51 whereby a centrifuging travel of the fluid upwardly within the jacket 50 is achieved. A pipe 54 or other conduit is connected to the jacket 50 adjacent the upper end thereof and serves to draw fluid directed to the annular compartment by the pump 53 from the annular compartment and is connected to the reservoir 31 for return of the fluid thereto.

The second form of the invention operates in the manner described for the first form with the additional additional advantage that the aqueous ammonia or other solution formed in the mixing chamber 16 is cooled after formation by turbulent travel about the evaporation chamber 15. Inasmuch as the saturation of a gallon of water with ammonia releases approximately 480 B. t. u. of heat it will be appreciated that the aqueous ammonia directed through the jacket 50 also serves to supply heat of vaporization to the anhydrous ammonia evaporated in the evaporation chamber 15. As before, the aqueous ammonia or other solution formed may be recirculated, as desired. When the desired concentration of the solute in the solvent is attained, the solution is drained from the reservoir through the conduit 46 by opening the valve 47.

Third form

The third form of the invention is illustrated in Fig. 5 and for descriptive convenience, all of the elements employed therein previously described in connection with the first and second forms of the invention are given the same identifying numerals.

It will be noted that a pair of evaporation chambers 15 of the character described are employed, one thereof being designated as a primary evaporation chamber 15A and the other as a secondary evaporation chamber 15B. In the third form, the line 13 serves to deliver liquid anhydrous ammonia to the central compartment 20 of both of the evaporation chambers 15A and 15B in total amounts regulated by the valve 25 and measured by the meter 24. It will subsequently become apparent that the evaporation chambers 15A and 15B have different cooling requirements and thus it is desirable to regulate the proportions of the total flow of anhydrous ammonia through the individual chambers. For this purpose, a valve 25A is positioned in the line 13 adjacent to the chamber 15A and valve 25B provided in the line 13 adjacent to the chamber 15B. The liquid ammonia is released from its initial pressure through expansion valves 26, or the valves 25A and 25B, as desired, and a substantial cooling effect obtained within the central compartments 20, as previously described. The gas conduit 37 provides passage from the upper ends of the central compartments 20 to the upper end of the mixing chamber 16 where gasous ammonia from both evaporation chambers is discharged into the mixing chamber, as previously described.

The pump 33 serves to deliver water or other fluid from the reservoir 31 into the lower compartment 19 of the primary evaporation chamber 15A and to force the water or said other fluid through the tubes 23 and into the upper compartment 21 of said chamber. In this form, as in the other forms of the present invention, the conduit 40 connected to the upper end of the primary evaporation chamber 15A may be extended into the mixing chamber 16 in a plurality of positions and provided with a plurality of the spray nozzles 41 in any desired arrangement.

A conduit 60 is connected to the sump 42 of the mixing chamber 16 and to the lower compartment 19 of the secondary evaporation chamber 15B. Aqueous ammonia or other solution formed in the mixing chamber is directed by the conduit 60 into the secondary evaporation chamber 15B and upwardly through the tubes 23 thereof to achieve a secondary cooling incident to the evaporation of the ammonia in said secondary chamber. A drainage conduit 61 is connected at one end to the upper end of the secondary evaporation chamber 15B and at its opposite end to the reservoir 31. A pump 62 provided in the conduit 60 and/or the pump 33 are utilized to remove solution from the sump 42 at a rate sufficient to maintain a pressure in the central compartments of both of the evaporation chambers at or below the point at which the anhydrous ammonia or other solute released therein through the expansion valves 26 will boil.

The process and apparatus of the present invention permit the economical formation of aqueous ammonia and other solutions from solutes having relatively low boiling points in solutions having relatively higher boiling points which are characterized by the release of substantial quantities of heat when interacted.

The present invention has obviated the requirements for elaborate refrigeration systems to cool the solutions and the previous requirements for independent sources of heat to facilitate vaporization of the liquid anhydrous ammonia. The apparatus whether of the first, second, or third form, is simple, economical to construct, and sufficiently lightweight to permit mobility.

It has been found that substantial reductions in the cost of aqueous ammonia to farmers and the like can be achieved by the practice of the present invention. No longer is it necessary to impose upon the purchaser of aqueous ammonia and like materials those expenses incident to the transporting of large quantities of water. The present invention makes possible the rapid and economical formation of aqueous ammonia and similar materials near their points of use as long as water, or other solvent, and liquid anhydrous ammonia, or other solute, are available. Every railroad siding and other location accessible by mobile containers of liquid anhydrous ammonia and at which water is available becomes a convenient production site for aqueous ammonia.

Both the process and the apparatus described are thermally self-sufficient, may be practiced and operated as either a batch or continuous process, and successfully attain any desired ammonia concentration in the water by proper regulation of the valves 25 and 30 as well as the volumes pumped by the pumps 33, 45, 53 or 62 which may be motivated at selected speeds in any suitable manner by electric motors, internal combustion engines, or other prime movers, not shown.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent processes, devices, apparatus and systems.

Having described our invention, what we claim as new and desire to secure by Letters Patent is:

1. A process for the direct conversion of anhydrous ammonia to aqueous ammonia comprising releasing liquid anhydrous ammonia under initial pressure into a vaporization chamber under substantially reduced pressure to vaporize the ammonia, passing water through the chamber in isolated heat exchanging relation to the vaporized ammonia to cool the water and to supply heat of vaporization to the liquid ammonia released into the chamber, releasing the gaseous ammonia from the vaporization chamber downwardly into a separate mixing chamber, and spraying the precooled water upwardly into the gaseous ammonia in the mixing chamber.

2. A process for the preparation of aqueous ammonia from liquid anhydrous ammonia under initial pressure comprising subjecting the liquid anhydrous ammonia to a substantially reduced pressure to vaporize the liquid ammonia, passing water through the vaporized ammonia in isolated heat exchanging relation thereto to cool the water and to replace heat of vaporization of the ammonia, spraying the precooled water upwardly against vaporized ammonia to form aqueous ammonia, and cooling the aqueous ammonia by vaporizing liquid anhydrous ammonia in isolated heat exchanging relation to the aqueous ammonia.

3. A thermally balanced process for the preparation of aqueous ammonia from anhydrous ammonia under initial pressure adequate to maintain the ammonia in a liquid state at a given environmental temperature comprising subjecting the liquid anhydrous ammonia to a sufficiently reduced pressure at the environmental temperature to vaporize the ammonia, passing water at substantially environmental temperature through the vaporized ammonia in isolated heat exchanging relation thereto to cool the water by the vaporization of the ammonia, spraying the water precooled by heat transfer to the ammonia upwardly into downwardly directed gaseous ammonia preheated by heat transfer from the water to form aqueous ammonia, and postcooling the aqueous ammonia by passing the same in isolated heat exchanging relation through the anhydrous ammonia at the point of subjection to reduced pressure, the volume and temperature of the water and the volume of the aqueous ammonia passed through the anhydrous ammonia at the point of reduced pressure being sufficient substantially to compensate for the heat loss incident to vaporization of the ammonia.

4. A process for converting anhydrous ammonia under an initial pressure sufficient to maintain the ammonia in liquid form at environmental temperature to aqueous ammonia comprising vaporizing the anhydrous ammonia by releasing it from its initial pressure, passing water in isolated heat exchanging relation through the anhydrous ammonia concurrently with its vaporization to cool the water by replacement of heat of vaporization of the ammonia, drawing-off anhydrous ammonia vapor from the ammonia released from its initial pressure so as to exclude liquid ammonia, and subsequently to the vaporization of the ammonia and passage of the water in isolated relation therethrough dissolving the vaporized ammonia drawn off from the ammonia released from its initial pressure in a spray of the water precooled by said vaporization of the ammonia.

5. A process for converting liquid anhydrous ammonia under initial pressure into aqueous ammonia comprising releasing the ammonia from its initial pressure to form anhydrous ammonia vapor, concurrently with the release of the ammonia from the pressure, passing water in isolated heat exchanging relation through the ammonia to supply vaporizing heat to the ammonia and to cool the water, and subsequently directing the vaporized ammonia downwardly against an upwardly directed spray of the cooled water to dissolve the vaporizing ammonia in the water.

6. A thermally balanced process, for the preparation of a solution of a solute that is gas under normal atmospheric temperatures and pressures but which is under initial pressure sufficient to maintain the solute in liquid form in a liquid solvent for the solute having a relatively higher boiling point than the solute characterized by the release of heat when interacted with the solute upon contact, comprising vaporizing the solute by releasing it from its initial pressure, flowing the liquid solvent through the vaporized solute in isolated heat exchange relation to the solute to cool the solvent by replacement of heat of vaporization of the solute, drawing off solute vapor from the solute released from its initial pressure to exclude liquid solute, and subsequently directing the vaporized solute into a spray of precooled solvent to dissolve the solute in the solvent.

7. A thermally balanced process for continuously forming an aqueous solution of an anhydrous solute, under initial pressure sufficient to maintain the solute in liquid form comprising precooling water to receive the solute and preconditioning the liquid solute for dissolving in the water in gaseous form, by releasing the liquid anhydrous solute under initial pressure into a vaporization chamber under substantially reduced pressure to vaporize the solute while concurrently passing water through the chamber in isolated heat exchanging relation to the vaporized solute; and concurrently releasing the vaporized solute thus formed downwardly into a separate mixing chamber while spraying the precooled water upwardly into the gaseous solute to form an aqueous solution of the solute.

References Cited in the file of this patent

UNITED STATES PATENTS

| 342,722 | Wren | May 25, 1886 |
| 568,615 | Haubtman | Sept. 29, 1896 |
| 886,661 | Stumpf | May 5, 1908 |
| 1,885,012 | Harvey | Oct. 25, 1932 |
| 1,954,973 | Zaniboni | Apr. 17, 1934 |

FOREIGN PATENTS

| 22,402 | Australia | Apr. 27, 1935 |
| 538,392 | Great Britain | July 31, 1941 |